United States Patent [19]

Bonomo

[11] 4,201,081

[45] May 6, 1980

[54] PRESSURE RESPONSIVE SENSING DEVICE

[75] Inventor: Melvin E. Bonomo, Bloomington, Ill.

[73] Assignee: M & W Gear Company, Gibson City, Ill.

[21] Appl. No.: 925,046

[22] Filed: Jul. 17, 1978

[51] Int. Cl.² ............................................. G01G 5/04
[52] U.S. Cl. .................................... 73/141 R; 73/706; 177/208
[58] Field of Search ................. 73/141 A, 141 R, 745, 73/746, 726, 727, 728, 820; 177/208

[56] References Cited

U.S. PATENT DOCUMENTS

| | | | |
|---|---|---|---|
| 2,125,483 | 8/1938 | Blanchard | 73/820 |
| 2,993,369 | 7/1961 | Bonomo et al. | 73/116 |
| 3,273,470 | 9/1966 | Bradley | 73/141 R X |
| 3,341,796 | 9/1967 | Eisele | 73/141 A X |
| 3,425,503 | 2/1969 | Bullivant et al. | 73/141 R X |
| 3,633,696 | 1/1972 | Kleysteuber | 73/141 R |
| 3,889,529 | 6/1975 | Bradley | 177/208 X |

Primary Examiner—Daniel M. Yasich
Attorney, Agent, or Firm—Allegretti, Newitt, Witcoff & McAndrews

[57] ABSTRACT

A pressure responsive sensing device includes a housing defining a chamber. The chamber is filled with a non-compressible fluid and is closed at one end by a diaphragm. The diaphragm is retained in position by a cover plate. A stem connected to the outside of the cover plate projects through a bearing passage and has an outer end exposed to receive a force. A force on the end of the stem is transmitted via the plate and diaphragm against the fluid in the chamber. The pressure in the chamber, in turn, is transmitted ,o an electronic transducer sensing device through a constricted passage in the wall of the housing.

3 Claims, 2 Drawing Figures

PRESSURE RESPONSIVE SENSING DEVICE

BACKGROUND OF THE INVENTION

The present invention relates to a sensing device, and more particularly, to an improved pressure sensitive measurement device.

In the measurement of mechanical power, e.g., the mechanical power of an internal combustion engine, dynamometers are often utilized. Generally, an absorption dynamometer, such as a water brake dynamometer, produces a measurable torque output by creating a constant restraint in opposition to the mechanical power being measured. Thus a torque arm of precisely measured length acts against a sensing device to provide a measurement of torque output. The present invention relates to an improved sensing device which cooperates with such a torque arm and provides a measured output signal.

SUMMARY OF THE INVENTION

Briefly, the improved pressure sensitive measurement device comprises a housing defining a chamber. A generally non-compressible fluid is retained in the chamber. An electronic transducer device is coupled to the chamber. Thus a diaphragm defining a wall of the chamber cooperates with a plate member supporting the diaphragm and a stem for imparting force against the plate and compressible fluid.

A constricted passage is defined through a wall of the housing to the chamber and serves to couple the chamber and the electronic transducer. Fluid within the constricted passage transmits a pressure signal to the electronic transducer device.

It is thus an object of the present invention to provide an improved pressure sensitive measurement device for, e.g., sensing and measuring the force output from the torque arm of a dynamometer.

Another object of the present invention is to provide an improved pressure sensitive measurement device which includes a conventional electronic transducer device.

Another object of the present invention is to provide an improved pressure sensitive measurement device having an output signal which is substantially free of undesired high-frequency components.

Another object of the present invention is to provide an improved pressure sensitive measurement device which is self-damping.

A further object of the present invention is to provide an improved pressure sensitive measurement device which is highly stable over extended periods of time in service and which has substantially no hysteresis in its signal output.

A still further object of the present invention is to provide an improved pressure sensitive measurement device which includes a fluid sealed within a chamber.

These and other objects, advantages and features of the present invention will become apparent from the detailed description of the preferred embodiment, which follows.

BRIEF DESCRIPTION OF THE DRAWING

The preferred embodiment of the present invention will be described in relation to the accompanying drawing, wherein.

DESCRIPTION OF THE PREFERRED EMBODIMENT

Figure 1:
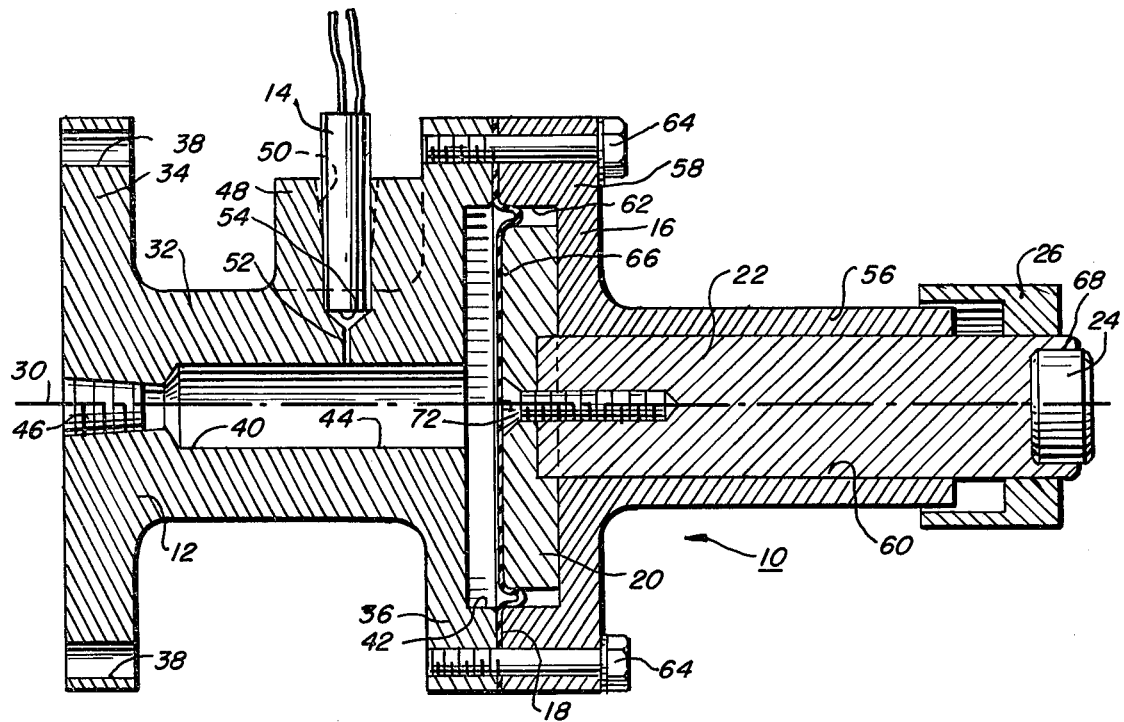
FIG. 1 is a cross-sectional view of the preferred embodiment of the present invention.

Referring to FIG. 1, the preferred embodiment of the present invention is an improved pressure sensitive measurement device shown and generally designated 10. Briefly, the device 10 includes a housing or base 12, an electronic transducer device 14, a cover plate or push rod cover 16, a diaphragm member such as diaphragm 18, a plate member such as piston 20, a stem such as push rod 22, an anvil 24 and a dust cap 26. The device 10 also includes a non-compressible fluid 28, shown only in FIG. 2 for clarity.

As shown in FIG. 1, the housing 12, the push rod cover 16, the diaphragm 18, the piston 20, the push rod 22, the anvil 24 and the dust cap 26 are aligned along a common central axis 30. Generally, the surfaces of these components 12, 16, 18, 20, 22, 24 and 26 are surfaces of revolution, such as would be generated by revolving lines about the central axis 30.

The housing or base 12 includes a center, cylindrical wall portion 32 joined with two integrally formed, end flanges 34, 36. The first flange 34, shown to the left in FIG. 1, is adapted for mounting the device 10 on a surface (not shown). For this purpose, a plurality of openings 38 are defined about the periphery of flange 34, for receiving fasteners such as machine bolts (not shown).

A chamber 40 is defined in housing 12 by the wall portion 32 and the second end flange 36. A first, larger diameter portion or bore 42 of the chamber 40 is formed in the housing 12 and projects through flange 36 into the wall portion 32. A second, smaller diameter portion or bore 44 completes the chamber 40 and extends inward into the housing 12 from the bore 42. The end of chamber 40 opposite the first bore 42, includes a passage 45 blocked by a pipe plug 46 which is threaded into the housing 12.

Adjacent the second end flange 36, an integrally formed, transducer-receiving portion of stud 48 projects from wall portion 32 of housing 12. A recess or counterbore 50 is drilled through the stud 48. Counterbore 50 extends substantially perpendicular to the central axis 30. A constricted passage 52 joins the counterbore 50 with the chamber 40. The electronic transducer device 14 fits and is retained within the counterbore 50. Alternatively transducer 14 can be connected by a tube (not shown) with passage 52 and moved to a remote position.

The electronic transducer device 14 is a conventional device capable of generating an electrical signal in response to pressure against a face 54. For example, an electronic transducer device 14 known to be useful for such purposes is the absolute pressure transducer manufactured by National Semiconductor, selected from among the LX14 series. Pressure responsive face 54 must be positioned in communication with passage 52.

Referring again to FIG. 1, the cover plate 16 includes an elongated, cylindrical bearing passage 56 and an integral, outwardly extending chamber cap 58. The passage 56 defines a bearing surface 60. The chamber cap 58 also includes a piston-receiving counterbore 62 and is attached in opposed relation to the second end flange 36 by peripherally spaced fasteners 54. The cover plate 16 thus substantially encloses the chamber 40.

Secured between the base 12 and the push rod housing 16 is the diaphragm 18. The diaphragm 18 is co-extensive with the second end flange 36 and the chamber cap 58. Formed of rubber or like flexible material, the diaphragm 18 is preferably a Bellofram linear seal #4C350-25-DJP.

The plate-like piston 20 fits loosely within the piston receiving counterbore 62. Due to pressure of fluid in chamber 40 the diaphragm 18 forms a generally planar interior surface 66 against the face of the piston 20. In the gap between the piston 20 and the counterbore 62, the diaphragm 18 bulges outward of the chamber 40. This permits movement of the central portion of the diaphragm 18 in relation to its periphery. The gap is sufficiently small that the diaphragm 18 bridges the gap without being over-stressed.

Stem or push rod 22 is attached to the piston 20 by a screw 72. As shown, the stem 22 extends outward from the piston 20 along axis 30 and is supported on the bearing surface 60. The diameter of the push rod 22 is substantially equal to but less than the diameter of the bearing surface 60. The push rod 22 and piston 20 are thus slidable within the cover plate 16 and, more particularly, the rod 22 is mounted to minimize friction of rod 22 on surface 60. Such frictionless mounting is attributable, in part, to the ratio of the length (L) of bearing 60 to the diameter (D) of stem 22. The preferred ratio of L/D is generally greater than 2 to 1 and preferably about 2.5 to 1.

The push rod 22 includes an exposed end which is attached to the anvil 24. The anvil 24 is formed of high strength steel or the like, and is adapted to receive a time-variable force as represented by arrow 70 in FIG. 2.

Once the device 10 is assembled, an appropriate fluid 28 is introduced into the chamber 40 through passage 45. The fluid, which is preferably hydraulic oil, fills the chamber 40 and the constricted passage 52. Plug 46 engages opening 45 to retain the fluid 28 in chamber 40.

Figure 2:
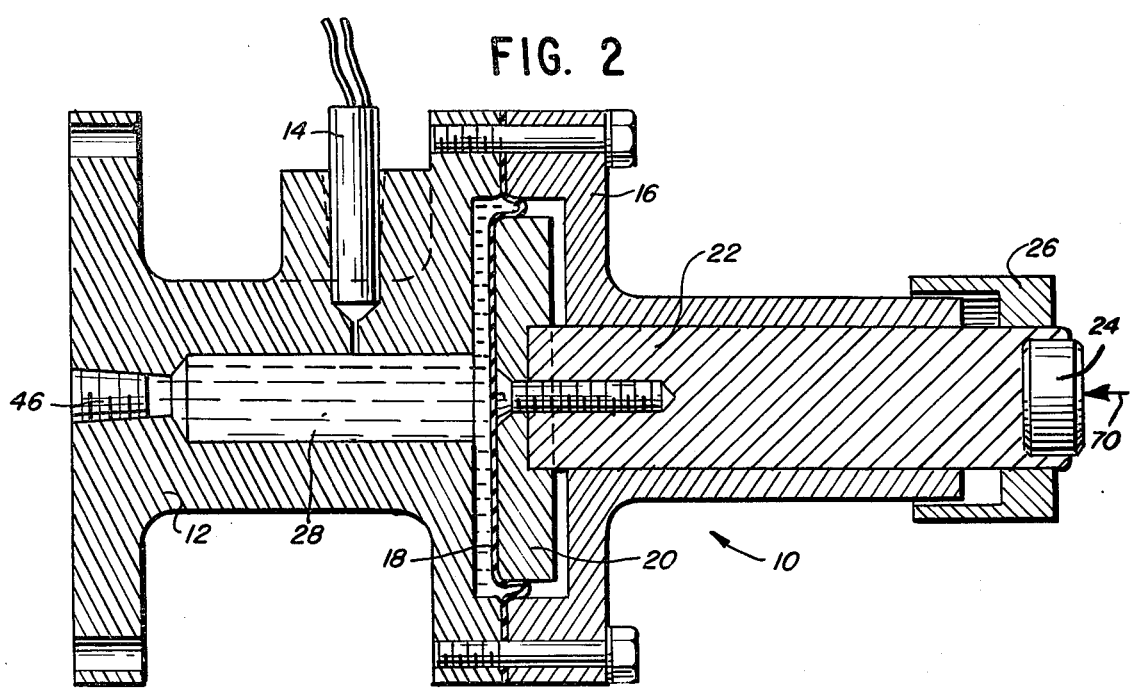
FIG. 2 is a cross-sectional view similar to FIG. 1, depicting an exaggerated movement of the stem, plate member and diaphragm member thereof.

As can be seen by comparing FIG. 1 with FIG. 2, application of the force 70 against the anvil 24 results in axial, sliding movement of the push rod 22 and the piston 20, toward the base 12. It should be understood that the movement depicted in FIG. 2 is exaggerated. Because the fluid 28 is non-compressible, readily perceivable movement of the push rod 22 and the piston 20 does not occur.

The force 70 is transmitted through the diaphragm 18 to the fluid 28, with the pressure on the fluid 28 within the chamber 40 being equal to the product of the force times the area of the interior surface 66 of the diaphragm 18. This pressure is transmitted through the constricted passage 52, and is sensed by the electronic transducer device 14.

As most preferred, the constricted passage 52 has a diameter of one-sixteenth (1/16th) inch and the ratio of the area of the piston 20 to that of the anvil 24 is 10 to 1. A constricted passage 52 of this diameter has been found to be highly compatible with an electronic transducer device 14 from National Semiconductor and effectively filters undesired high frequency components such as hysteresis of the time-variable force 70. A piston 20 and anvil 24 of these relative areas limit the pressure of the fluid 28 to within the maximum operating pressure of the device 14, over a desirable range of magnitudes of force 70.

From the foregoing, it should be apparent to those of ordinary skill in the art that a highly useful, improved pressure sensor transductor measurement device 10 is disclosed herein. As will also be apparent, the preferred embodiment of the present invention may be modified, if so desired. The preferred embodiment is thus to be considered as illustrative and not restrictive, the scope of the present invention being measured by the appended claims.

What is claimed is:

1. An improved pressure sensitive transducer measurement device comprising, in combination:
    a housing, said housing defining a chamber open at one end having a tubular housing wall;
    a generally non-compressible fluid within the chamber;
    a constricted passage through the housing wall to the chamber for receipt of said fluid;
    an electronic transducer device attached to the housing in communication with the constricted passage and on the outside of the chamber;
    a cover plate over the open end of the housing and attached to enclose the chamber;
    a diaphragm member retained between the cover plate and the housing and defining a generally planar interior surface of the chamber at the open end;
    a plate member retained by the cover plate in opposed relation with the diaphragm member on the side of the diaphragm member opposite the interior of the chamber;
    said cover plate having a bearing passage defining a bearing surface; and
    a stem connected to the plate member and having an anvil attached to an end, said end generally frictionlessly projecting through the bearing passage in the cover plate for receipt of a force, said stem transmitting said force through the plate member against the diaphragm and to the noncompressible fluid within the chamber, so that the pressure in the fluid is equal to the force divided by the area of the interior surface of the diaphragm member, said pressure being transmitted through the constricted passage to the electronic transducer device, the diameter of the constricted passage and the ratio of the area of said plate member to the anvil so dimensioned to thereby avoid hysteresis in the output of said device, the ratio of the length of the bearing surface to the diameter of the stem being greater than 2.0 to 1.

2. The device of claim 1 wherein the ratio of the area of the surface of said plate member against the diaphragm to the exposed area of said anvil is substantially 10 to 1.

3. The device of claim 1 wherein the ratio of the length of said bearing surface to the diameter of said stem is substantially 2.5 to 1.

* * * * *